United States Patent [19]

Burelbach et al.

[11] Patent Number: 4,568,515
[45] Date of Patent: Feb. 4, 1986

[54] CONTROL SYSTEM FOR A SMALL FISSION REACTOR

[75] Inventors: James P. Burelbach, Glen Ellyn; William J. Kann, Park Ridge; James G. Saiveau, Hickory Hills, all of Ill.

[73] Assignee: The United States of America as represented by the United States Department of Energy, Washington, D.C.

[21] Appl. No.: 699,887

[22] Filed: Feb. 8, 1985

[51] Int. Cl.[4] .............................................. G21C 7/10
[52] U.S. Cl. .................................. 376/220; 376/327; 376/335
[58] Field of Search ............... 376/335, 220, 221, 327, 376/227

[56] References Cited

U.S. PATENT DOCUMENTS

| T954,003 | 1/1977 | Basdekas et al. |
|---|---|---|
| 2,905,612 | 9/1959 | Borst |
| 2,990,355 | 6/1961 | Nordheim et al. |
| 3,140,410 | 7/1964 | McLafferty |
| 3,383,285 | 5/1968 | Ackroyd et al. |
| 3,510,399 | 5/1970 | Terasawa et al. |
| 3,988,203 | 10/1976 | Kuzavkov et al. |
| 4,024,018 | 5/1977 | Barnes |
| 4,111,747 | 9/1978 | Eck et al. |

Primary Examiner—Harvey E. Behrend
Attorney, Agent, or Firm—Hugh W. Glenn; Robert J. Fisher; Judson R. Hightower

[57] ABSTRACT

A system for controlling the reactivity of a small fission reactor includes an elongated, flexible hollow tube in the general form of a helical coiled spring axially positioned around and outside of the reactor vessel in an annular space between the reactor vessel and a surrounding cylindrical-shaped neutron reflector. A neutron absorbing material is provided within the hollow tube with the rate of the reaction controlled by the extension and compression of the hollow tube, e.g., extension of the tube increases reactivity while its compression reduces reactivity, in varying the amount of neutron absorbing material disposed between the reactor vessel and the neutron reflector. Conventional mechanical displacement means may be employed to control the coil density of the hollow tube as desired. In another embodiment, a plurality of flexible hollow tubes each containing a neutron absorber are positioned adjacent to one another in spaced relation around the periphery of the reactor vessel and inside the outer neutron reflector with reactivity controlled by the extension and compression of all or some of the coiled hollow tubes. Yet another embodiment of the invention envisions the neutron reflector in the form of an expandable coil spring positioned in an annular space between the reactor vessel and an outer neutron absorbing structure for controlling the neutron flux reflected back into the reactor vessel.

19 Claims, 4 Drawing Figures

CONTROL SYSTEM FOR A SMALL FISSION REACTOR

CONTRACTUAL ORIGIN OF THE INVENTION

The United States Government has rights in this invention under Contract No. W-31-109-ENG-38 between the U.S. Department of Energy and Argonne National Laboratory.

BACKGROUND OF THE INVENTION

This invention relates generally to fission reactors and is particularly directed to a system for controlling the reaction rate, or reactivity, of a small fission reactor.

The typical nuclear fission reactor employs a core having fuel and control elements located therein according to a specific matrix. The control elements are raised and lowered relative to the fuel elements in controlling the fission reaction rate. In most circumstances, with the control elements fully inserted into the core the fission reaction is at its minimum, or lowest, rate or the reactor is shut down. With the control elements withdrawn from the core, or positioned beyond a predetermined location within the core, the fission reaction is allowed to progress at its maximum rate. By varying the position of the control elements, which are typically in the form of rods, the reactivity may be controlled. The control elements are generally comprised of boron or some other "poison" material which absorbs the fast neutrons emitted from the fuel elements which are necessary for sustaining the fission reaction.

In most liquid metal fast breeder reactors the entire core is submerged in a pool of coolant which is typically liquid sodium. The sodium is forced through the passages of the core and over the fuel and control elements therein in order to remove the heat generated in the fission reaction. An intermediate sodium-to-sodium heat exchanger generally is used to take the heat from the primary sodium coolant and transfer it to a separate supply of secondary sodium coolant which is then directed via a closed loop through a water-to-sodium heat exchanger wherein steam is generated. The steam is allowed to expand through turbines which, in combination with other power conversion apparatus, is used for driving generators for producing electrical energy.

The control elements are generally located within the reactor vessel and in direct contact with the sodium coolant. This arrangement limits accessibility to the control elements for maintenance and replacement purposes. The liquid sodium coolant is chemically reactive and thus necessary precautions typically involving complicated procedures must be taken to eliminate oxidation during the inspection and replacement of the control elements. In addition, the small size of the typical liquid metal fast breeder reactor core imposes restrictions on its control system. For example, because the fuel core of a fast breeder reactor is constructed with a comparatively compact arrangement of fuel of high concentration and is thus small in size compared to that of thermal reactors, a closely spaced arrangement of control rods is typically required in such reactors. The control drive system thus must operate in an extremely limited space thus complicating the reactor control mechanisms.

The present invention addresses the aforementioned problems encountered in a small nuclear reactor such as of the liquid metal fast breeder type by providing, in one embodiment, a single control element which is located outside of the reactor core and is thus easily accessible. Another embodiment employs a plurality of control elements which are located outside of the reactor core, are easily manipulated, and which provide a high degree of control over the reaction rate within the reactor core.

OBJECTS AND SUMMARY OF THE INVENTION

Accordingly, it is an object of the present invention to provide an improved arrangement for controlling the reactivity of a fission reactor.

It is another object of the present invention to provide means for controlling the reactivity of a fission reactor located outside of the reactor vessel.

Yet another object of the present invention is to increase the accessibility of the control elements in a fission reactor for inspection, maintenance and replacement purposes.

A further object of the present invention is to provide a control arrangement for a fission reactor which includes a single movable control element which is easily manipulated, highly accessible and reliable, and not subject to corrosion or wear.

A still further object of the present invention is to provide a control system particularly adapted for use in a small fission reactor which is easily maintained and highly reliable.

The present invention contemplates a control system for a fission reactor having a single movable element in the form of a helically coiled, flexible hollow tube which is stretchable (and compressible) along its longitudinal axis. The hollow tube is positioned around the periphery of the reactor vessel in an annular space between the reactor vessel and a surrounding neutron reflector and contains a neutron absorbing material such as boron carbide ($B_4C$). By expanding and compressing the hollow tube along its coiled axis, the amount of neutron absorbing material positioned between the reactor vessel and the neutron reflector may be varied for controlling the flux of neutrons reflected back into the reactor vessel. Compression of the hollow tube reduces reactivity, while extension of the hollow tube along its coiled axis increases the reactivity. With the hollow control tube outside of the reactor vessel, access to it is facilitated for inspection, maintenance or replacement purposes and it is not subject to heat exchanger (e.g., liquid sodium) induced corrosion. Conventional displacement means may be coupled to one end of the coiled hollow tube for extending or compressing it in controlling the reactivity of the reactor.

Another embodiment of the invention contemplates a plurality of coiled, flexible, hollow tubes positioned in a side-by-side arrangement around the periphery of the reactor vessel in the space between the reactor vessel and a neutron absorbing material surrounding the reactor vessel. Reactivity is controlled by the extension or compression of the individual hollow tubes in varying the amount of neutron absorbing material between the reactor vessel and the neutron reflector which is comprised of beryllium in a preferred embodiment.

Yet another embodiment of the invention envisions the reversal of the aforementioned neutron absorbing and reflecting materials in controlling the neutron flux reflected back into the reactor vessel. For example, the neutron reflector may be in the form of a flexible, helically wound spring positioned around the reactor vessel in an annular space between the reactor vessel and an outer neutron absorber. Varying the compression/extension of the neutron reflecting spring provides control over the neutron flux reflected back into the reactor vessel and hence the reactor's reactivity. While the present invention is particularly adapted for use with a small, cylindrical shaped fission reactor, the principles of the present invention are applicable to virtually any fission reactor.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
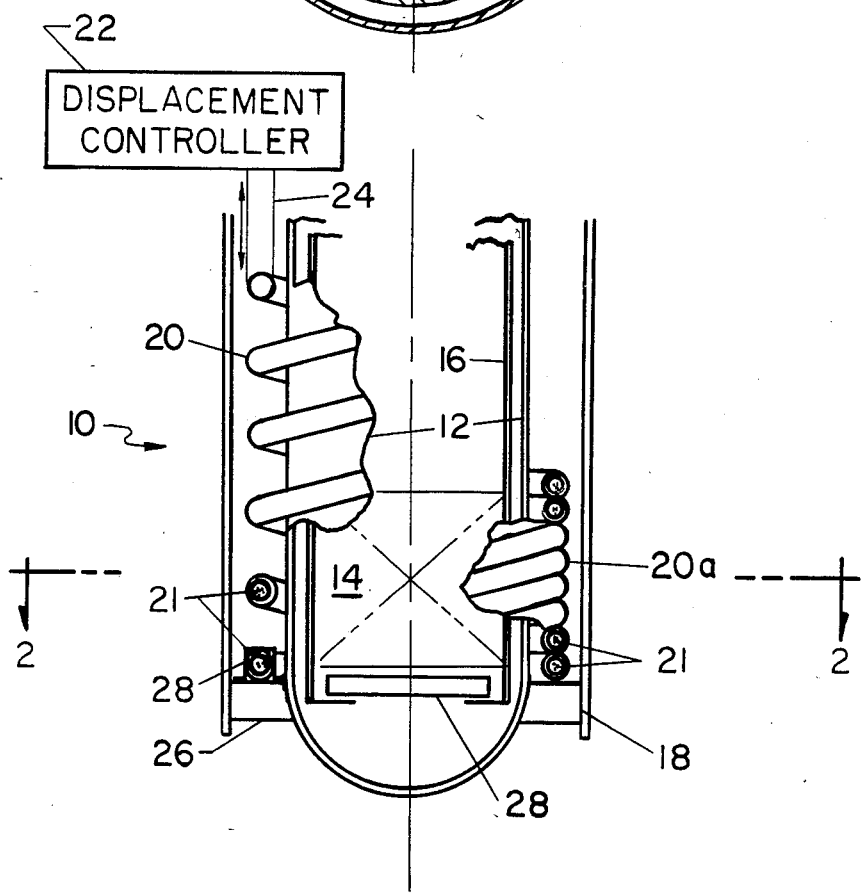
FIG. 1 is a partially cutaway diagrammatic sectional view of a control system for a fission reactor in accordance with the present invention.

Referring to FIG. 1, there is shown a partially cutaway diagrammatic sectional view of a control system 10 in accordance with the present invention for use in a fission reactor.

The reactor includes a reactor vessel 12 within which is positioned a reactor core 14. A nuclear fission reaction takes place within the reactor core 12 which is supported within the reactor vessel 12 by means of a core support assembly 16. The reactor core 14 is shown merely as a block in the figure for the sake of simplicity, it being understood that provided therein would be the nuclear fuel (not shown) as well as the liquid coolant 28, such as molten sodium, utilized to remove the thermal energy generated within the reactor vessel 12 for converting this energy to a more readily usable form.

Energetic neutrons are generated within the reactor core 14 during the fission process. A neutron deflector 18 preferably comprised of a material such as beryllium, beryllium oxide or graphite, is positioned around the reactor vessel 12 so as to define an annular space therebetween. The neutron reflector 18 serves to re-direct those energetic neutrons which escape from the reactor core 14 during the fission reaction back into the reactor core to initiate or sustain the reaction therein.

Figure 2:
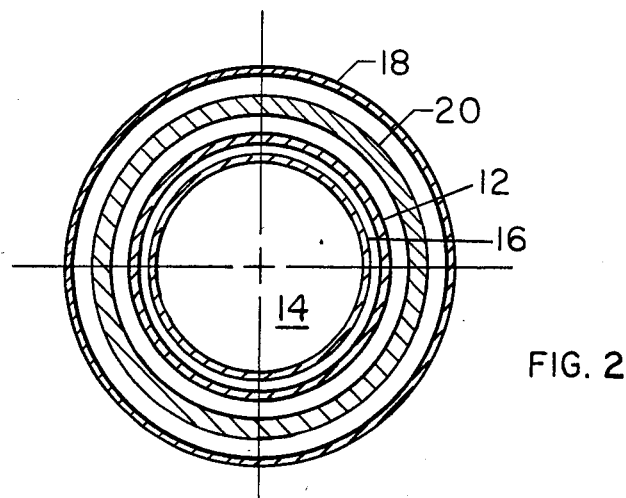
FIG. 2 is a sectional view of the fission reactor control system of FIG. 1 taken along sight line 2—2 therein.

Referring to FIG. 2, there is shown a sectional view of the control system 10 of FIG. 1 taken along sight line 2—2 therein. As can be seen from FIG. 2, the reactor vessel 12 as well as the reactor core 14 and core support assembly 16 possess generally circular cross sections. The neutron reflector 18 positioned about the periphery of the reactor vessel 12 in spaced relation so as to form an annular space therebetween similarly possesses a generally circular cross section. Fission reactors for which the control system of the present invention is intended for use generally possess a circular cross section, although the present invention is not limited to such a reactor vessel cross sectional shape. For operation of the present invention, it is only necessary that the neutron reflector 18 be positioned in spaced relation about the circumference of the reactor vessel 12 so as to form a space therebetween within which a control element (or elements), such as described immediately below, can be positioned.

Positioned within the annular space between the reactor vessel 12 and the neutron reflector 18 is a control element 20 in the form of a helically coiled, hollow tube. The control element 20 is comprised of a flexible, structurally strong material such as stainless steel which permits it to be expanded or compressed along an axis generally parallel to and coincident with the longitudinal axis of the reactor vessel 12. Positioned within the hollow tubular structure of the control element 20 is a neutron absorbing material 21 such as cadmium, hafnium or boron. An upper end of the helical control element 20 is coupled by means of coupling linkage 24 to a displacement controller 22 by means of which the length of the helical control element 20 may be adjusted as desired. The displacement controller 22 may be conventional in design including various well-known electrical and/or mechanical components with the specific implementation thereof not forming a part of the present invention. Similarly, conventional coupling linkage 24 may be utilized to connect the upper end of the control element 20 with the aforementioned displacement controller 22.

In a preferred embodiment, the lower end of the control element 20 is coupled to a support structure 26 adjacent to an outer portion of the lower end of the reactor vessel 12. The lower end of the helical control element 20 may be securely coupled to the support structure 26 by any of a variety of conventional connecting means such as a bracket 28. In this arrangement, adjacent coils of the control element 20 are normally in contact with one another to shut down the reactor. Increasing the reactivity requires the extension of the control element 20. It is not essential, however, for the operation of the present invention that the lower end of the helical control element 20 be securely coupled to the support structure 26. However, the lower end of the control element 20 must always be in contact with the upper surface of the support structure 26 in order to permit the helical control element 20 to be extended or compressed for reasons set forth in the following paragraphs.

Referring to the left hand cutaway portion of FIG. 1, the helical control element 20 is shown in the extended position wherein the upper end of the control element has been displaced upward by means of the combination of coupling linkage 24 and the displacement controller 22. In this configuration it can be seen that only three revolutions of the helical control element 20 are interposed between the reactor core 14 and the neutron reflector 18. Thus, a large number of the energetic neutrons which escape from the reactor core 14 will be reflected back into the reactor core by the neutron reflector 18. This is due to the fact that a minimum amount of neutron absorbing material 21 is positioned between the reactor core 14 and the neutron reflector 18 for absorbing these energetic neutrons. On the other hand, referring to the right hand cutaway portion of FIG. 1, there is shown the compressed configuration of the helical control element 20A wherein the maximum amount of neutron absorbing material 21 is interposed between the reactor core 14 and the neutron reflector 18 resulting in a minimum neutron flux being reflected back into the reactor core for shutting down the reactor or ensuring a minimum reactivity therein. A large continuum of extensible lengths of the helical control element is available between the configurations shown for control elements 20 and 20A permitting the control system of the present invention to provide a high degree of control over the reactor's reactivity over a wide, continuous range of reactivity levels.

Figure 3:
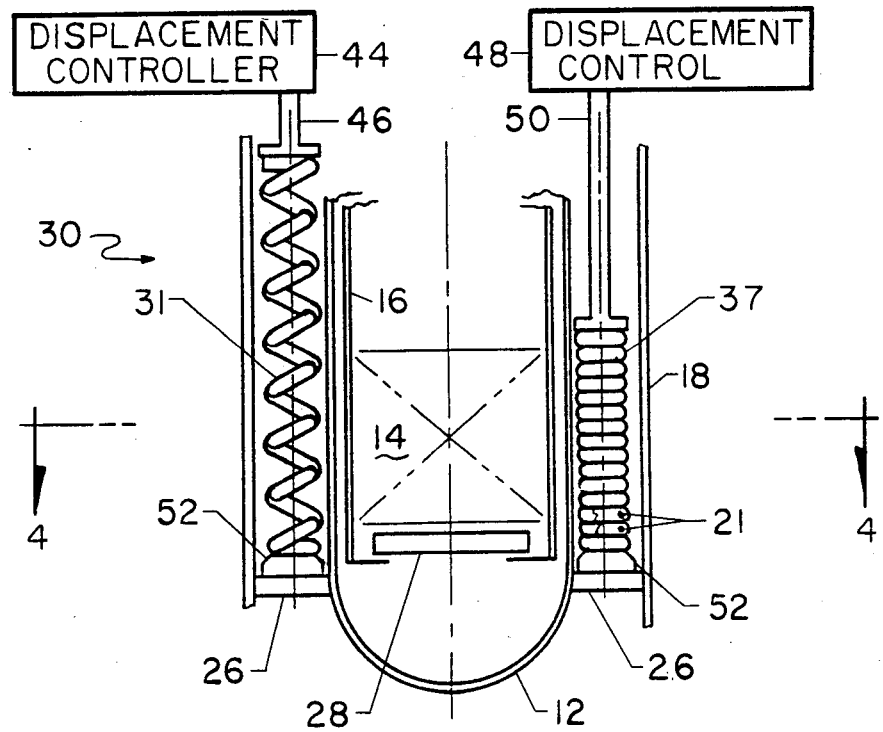
FIG. 3 is a partially cutaway diagrammatic sectional view of another embodiment of a fission reactor control system in accordance with the present invention.

Referring to FIG. 3, there is shown another embodiment of a control system 30 for a fission reactor in accordance with the principles of the present invention. Element numbers similar to those utilized in FIGS. 1 and 2 are used in FIG. 3 for equivalent structures. A sectional view of the control system 30 of FIG. 3 taken along sight line 4—4 therein is shown in FIG. 4.

Figure 4:
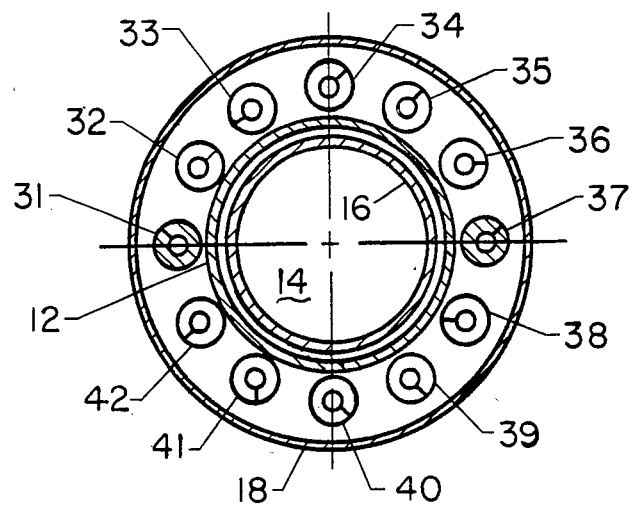
FIG. 4 is a sectional view of the fission reactor control system of FIG. 3 taken along sight line 4—4 therein.

The fission reactor control system 30 shown in FIGS. 3 and 4 is comprised of a plurality of helical control elements 31 through 42. The helical control elements 31-42 are positioned adjacent to one another in spaced relation and are arranged concentrically around the reactor vessel 12 within the annular space defined by the reactor vessel and the neutron reflector 18. As in the case of the first embodiment described earlier, each of the helical control elements 31-42 is comprised of an elongated, flexible hollow tube formed in the general shape of a coiled spring and is capable of being expanded or compressed along its longitudinal axis. Positioned within each of the helical control elements 31-42 is a neutron absorbing material 21 as described earlier. The lower end of helical control element 31 is coupled to the support structure 26 by means of a conventional connecting bracket 52, while the lower end of helical control element 37 is coupled to the support structure 26 by means of connecting bracket 52. Each of the other helical control elements shown in FIG. 4 may be similarly coupled to the supporting structure 26 positioned adjacent to a lower portion of the reactor vessel 12. The upper end of each of the helical control elements 31-42 is coupled to a conventional displacement controller by means of coupling linkage as described earlier. For example, as shown in FIG. 3, the upper ends of helical control elements 31 and 37 are respectively coupled to displacement controllers 44 and 48 by means of coupling linkages 46 and 50.

By coupling each of the helical control elements in FIG. 4 to a respective displacement controller as shown in FIG. 3, each control element may be independently displaced in exercising a high degree of control over the reactivity within the reactor core 14. For example, as shown in FIG. 3, helical control element 31 may be positioned in the fully extended configuration while helical control element 37 may be positioned in the fully compressed configuration. Thus, helical control element 31 will absorb relatively few energetic neutrons which will then be reflected back into the reactor core 14 by that portion of the neutron reflector 18 immediately adjacent to control element 31. On the other hand, the compressed configuration of helical control element 37 which provides a high coil density will result in the absorption of a large portion of the energetic neutrons which escape from the reactor core 14 during the fission reaction. By selectively controlling the length of each of the helical control elements 31-42 by means of a respective displacement controller, the reaction rate within the reactor core 14 may be precisely controlled. It should be pointed out that while the embodiment of the present invention shown in FIG. 3 discloses the use of separate displacement controllers for each of the helical control elements, the present invention is also adapted for use with a single displacement controller actuating and controlling the length of all of the helical control elements simultaneously.

While the present invention has thus far been described as including one or a plurality of elongated, flexible, hollow control elements in the general form of a helically coiled spring containing a neutron absorbing material and positioned between the reactor core and a surrounding neutron reflector, the present invention will work equally well if the functions performed by the helical member and the outer concentric structure are interchanged. For example, the helical control element, or elements, may be comprised of a neutron reflecting material, such as those mentioned above, while the outer structure concentrically positioned about the reactor core so as to form an annular space therebetween may function as the neutron absorber. In this case, compression of the helical control element resulting in an increase in the coil density around the reactor core will cause more energetic neutrons to be reflected back into the reactor core in increasing the reactivity therein. Similarly, extension of the helical control element, or elements, will result in an increased number of energetic neutrons passing between the coils of the neutron reflecting control elements allowing these energetic neutrons to be absorbed by the outer neutron absorbing structure. This latter situation will result in a reduction in the reactivity within the nuclear reactor and will permit it to be shut down.

There has thus been shown a control system particularly adapted for use in a small fission reactor which includes one, or several, easily manipulated control elements positioned outside of the reactor core for controlling the neutron flux within the core. The control element, or elements, is in the form of an elongated, flexible hollow tube formed in the shape of a helically coiled spring and containing a neutron absorbing material. The helical control element, or elements, is positioned about the reactor core in an annular space defined by the reactor vessel and an outer neutron reflector for controlling the neutron flux reflected back into the core. In one arrangement, the normal state of the control element is in the tightly coiled, compressed configuration wherein the reactor is shut down. The control element must therefore be expanded under the control of the displacement controller in order to initiate and sustain the nuclear reaction. In this arrangement, failure of the displacement controller or associated connecting linkage will result in the retraction of the coiled control element and the shut down of the reactor. In another embodiment, the flexible, helical control element is comprised of a neutron reflecting material and is positioned between the reactor core and an outer neutron absorber disposed around the reactor core. In this arrangement the compressible and expandable control element, or elements, either reflects the energetic neutrons back into the reactor core for increasing the reactivity therein when compressed or, in the expanded configuration, permits increasing numbers of the energetic neutrons to escape from the reactor core and be absorbed by the outer neutron absorber for reducing the reaction rate within the core.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A system for controlling the reactivity of a fission reactor including a reactor core containing a liquid coolant and wherein occur fission reactions producing energetic neutrons which initiate and sustain said fission reactions, said system comprising:

neutron reflecting means positioned around the reactor core in spaced relation with respect thereto so as to define a space therebetween for reflecting energetic neutrons which escape from the reactor core back into the reactor core for sustaining the fission reactions therein;

variable length control means positioned within the space between said reactor core and said neutron reflecting means for absorbing neutrons which escape from the reactor core, said control means including at least one flexible, helically coiled control element positioned around the periphery of the reactor core; and displacement means coupled to said control means for varying the length of said control means positioned between said reactor core and said neutron reflecting means in regulating the number of energetic neutrons absorbed and controlling the reactivity of the fission reactor.

2. The control system of claim 1 wherein said control means comprises a single flexible, helically coiled control element including a hollow tubular member disposed around the reactor core containing a neutron absorbing material along the length thereof.

3. The control system of claim 2 wherein a first end of said hollow tubular member is fixedly positioned with respect to the reactor core and a second end of said hollow tubular member is coupled to said displacement means for extending and compressing said hollow tubular member.

4. The control system of claim 3 wherein said reactor core and said neutron reflecting means are generally circular in cross section with the space therebetween annular in shape and wherein said tubular member is in the form of a coiled spring.

5. The control system of claim 1 wherein said control means includes a plurality of control elements positioned adjacent to one another in spaced relation around the periphery of the reactor core in a concentric manner.

6. The control system of claim 5 wherein said displacement means includes a plurality of displacement controllers each coupled to a respective control element.

7. The control system of claim 6 wherein each control element comprises a flexible, helically coiled hollow tubular member containing a neutron absorbing material along the length thereof.

8. The control system of claim 7 wherein a first end of each of said hollow tubular members is fixedly positioned with respect to the reactor core and a second end thereof is coupled to said displacement means for extending and compressing said hollow tubular member.

9. The control system of claim 5 wherein said reactor core and said neutron reflecting means have generally circular cross sections with the space therebetween annular in shape and wherein said plurality of control elements are positioned in a generally circular array around the reactor core.

10. The control system of claim 1 wherein said neutron reflecting means is comprised of a material from the group of cadmium, hafnium and boron.

11. The control system of claim 1 wherein said at least one flexible, helically coiled control element is comprised of a hollow stainless steel tube containing a neutron absorbing material.

12. The control system of claim 11 wherein said neutron absorbing material is comprised of a material from the group of beryllium, beryllium oxide and graphite.

13. A system for controlling the reactivity of a fission reactor including a reactor core containing a liquid coolant and wherein occur fission reactions producing energetic neutrons which initiate and sustain said fission reactions, said system comprising:

neutron absorbing means positioned around the reactor core in spaced relation with respect thereto so as to define a space therebetween for absorbing energetic neutrons which escape from the reactor core;

variable length control means positioned within the space between said reactor core and said neutron absorbing means for reflecting escaping neutrons back into the reactor core, said control means including at least one flexible, helically coiled control element positioned around the periphery of the reactor core; and displacement means coupled to said control means for varying the length of said control means positioned between said reactor core and said neutron absorbing means in regulating the number of energetic neutrons reflected back into the reactor core and controlling the reactivity of the fission reactor.

14. The control system of claim 1 wherein said control means includes a single flexible, helically coiled control element comprised of a neutron reflecting material.

15. The control system of claim 14 wherein the neutron reflecting material is taken from the group cadmium, hafnium and boron.

16. The control system of claim 13 wherein said neutron absorbing means is comprised of a material from the group of beryllium, beryllium oxide and graphite.

17. The control system of claim 13 wherein said control means includes a plurality of control elements positioned adjacent to one another in spaced relation around the periphery of the reactor core in a concentric manner.

18. The control system of claim 17 wherein said displacement means includes a plurality of displacement controllers each coupled to a respective control element.

19. The control system of claim 17 wherein each control element includes a flexible, helically coiled member comprised of a neutron reflecting material.

* * * * *